United States Patent Office 3,305,499
Patented Feb. 21, 1967

3,305,499
ARTICLE OF PRESSED WOOD AND PROCESS
FOR MAKING SAME
Rowland S. Bevans, Morristown, N.J., assignor to American Radiator & Standard Sanitary Corporation, New York, N.Y., a corporation of Delaware
No Drawing. Filed June 4, 1965, Ser. No. 461,523
14 Claims. (Cl. 260—17.3)

This application is a continuation-in-part of application Serial No. 386,422, filed July 30, 1964, and now abandoned.

This invention relates to processes for forming objects of pressed wood from cellulosic materials, and in particular from ligno-cellulosic materials.

For brevity and clarity whenever the word "wood" is used hereafter in this description, it is understood that I include in its definition any cellulosic and ligno-cellulosic material. The cellulosic materials include substances such as, for example, flour and starch; and the ligno-cellulosic materials include natural constituents of trees and plants.

My invention provides a process for treating wood particles, which treated particles are then compressed in a mold to produce objects of pressed wood having great strength, hardness and density.

In accordance with my invention I treat wood particles by impregnating them with liquid ammonia. This treatment of wood with liquid ammonia apparently breaks down the hydrogen bonds between the molecules of the wood thereby permitting the molecules to move relative to each other. When the ammonia evaporates the hydrogen bonds probably reform and bind the molecules in their new position. The breakdown of the hydrogen bonds makes the wood particles easily deformable, that is, the wood is plasticized, so that upon being subjected to pressure the particles can be readily molded and compressed into a new form of high density. After the ammonia is removed the hydrogen bonds probably reform and the compressed particles retain the new form which has the appearance and properties of a continuous solid mass. The expression "liquid ammonia" as used herein is to be understood in its generally accepted scientific sense, denoting substantially pure ammonia, $NH_3$, in liquid form, and not as sometimes inaccurately employed, in connection with household cleaners for example, to denote an aqueous solution of ammonium hydroxide.

The role of ammonia as set forth above is by way of conjecture only. The ammonia may not only plasticize the wood by the breaking of hydrogen bonds, but may also react directly with the wood or ingredients therein to form bonds between wood particles.

The processes of my invention do not require the use of a resin to bond the wood particles as is required by other processes used in the preparation of pressed wood. This is of distinct advantage since the ammonia is not only considerably less expensive than the resins but may also be readily recovered.

In carrying out my invention the wood particles are impregnated with liquid ammonia by soaking for about from 1 to 15 minutes. A desired quantity of liquid ammonia-impregnated wood particles is then compressed in a mold of selected shape at pressures ranging from about 300 to about 2,500 lbs./sq. in. Where large size articles are desired, a preferred pressure range from about 300 to 500 lbs./sq. in. has been found to produce articles having smooth surfaces and useful strength. During the molding operation elevated temperature can be maintained, if desired, up to about 200° C. The pressure is maintained until most of the ammonia has evaporated. It is advantageous to release momentarily the pressure on the mold one or more times to permit escape of the ammonia. Sufficient ammonia escapes within from about 1 to 10 minutes, at which time the pressure and temperature are reduced and the object removed from the mold. However, longer exposures to the high pressures and temperatures are not detrimental to the process.

In forming the molded objects I prefer to use finely-divided particles of wood, such as, for example, woodflour. Particles of somewhat larger size, such as sawdust, can also be used in my process because I impart greater plasticity to them during molding. In usual pressed wood processes these larger particles do not fit together well, resulting in products of low density and rough surfaces.

While treatment with a resin is not necessary in preparing the molded objects according to the processes of my invention, I found it advantageous to add a resin to the wood particles, preferably before the treatment with liquid ammonia. The resin serves to aid in the bonding of the particles which were treated with the liquid ammonia.

Other agents may be added during the process to impart additional desirable properties to the pressed wood. For example, an agent which imparts water resistance to the object is desirably added prior to soaking in ammonia. Zinc stearate is very satisfactory for this purpose. Coloring agents may also be added to obtain products of desired hues.

The invention is illustrated by the following examples:

*Example I*

Zinc stearate in an amount of about 0.66% of the weight of the woodflour was added to and mixed with woodflour. The woodflour was then soaked in liquid ammonia for about 8 minutes, after which the liquid ammonia was decanted. The mixture of woodflour and zinc stearate was placed in a toilet seat mold which was then pressurized to about 300 to 500 lbs./sq. in. and a temperature of about 150° C. After 3 minutes the pressure was momentarily released. The pressure and heat were maintained for 5 more minutes after which the finished toilet seat was removed from the mold.

*Example II*

The procedure of Example I was repeated with the exception that a coloring agent was added to the plasticized woodflour prior to soaking in liquid ammonia.

*Example III*

Zinc stearate in an amount of 1% of the weight of sawdust was added to and rapidly mixed with the sawdust. The sawdust was then soaked in liquid ammonia for about 10 minutes and the excess liquid ammonia was then decanted. The mixture was placed in a mold shaped to form a desk top and subjected to a pressure of about 300 to 500 lbs./sq. in. for about 10 minutes. The pressure was then released and the desk top removed from the mold.

Example IV

Sawdust was mixed with about 30% of its weight in a urea-formaldehyde solution prepared to contain in parts by weight urea–800, 37% formaldehyde–720, water–485, sodium hydroxide–204, and borax–800. The mixture was then soaked in liquid ammonia for 8 minutes after which the liquid ammonia was decanted. The sawdust was then placed in a mold shaped in the form of the top of a work bench. The mold was maintained at a temperature of about 200° C. and a pressure of about 300 to 500 lbs./sq. in. for about 10 minutes. After cooling and releasing the pressure, the finished bench top was removed from the mold.

Example V

The procedure of Example IV was repeated except that zinc stearate in percentage amount indicated in Example III was added to the sawdust prior to soaking in the liquid ammonia.

In a similar manner other useful articles of pressed wood such as ash trays, platters, trays, and other utilitarian and decorative objects were also prepared.

The processes and examples set forth above are by way of illustration only, and it is to be understood that it is hereby intended to cover all changes and modifications of the conditions herein which do not constitute departures from the spirit of the invention.

What is claimed is:

1. A process for producing a pressed wood article from wood particles, said wood particles being selected from the class consisting of cellulosic and ligno-cellulosic materials, which comprises the following steps: soaking the wood particles in liquid ammonia until said wood particles are substantially completely impregnated with the liquid ammonia, removing ammonia from said impregnated wood particles; and molding said impregnated wood particles into a desired form at a pressure of up to about 2,500 lbs./sq. in.

2. A process for producing a pressed wood article from wood particles, said wood particles being selected from the class consisting of cellulosic and ligno-cellulosic materials, which comprises the following steps: soaking the wood particles in liquid ammonia until said wood particles are substantially completely impregnated with liquid ammonia, removing ammonia from said wood particles; and molding said impregnated wood particles into a desired form at a pressure of up to about 2,500 lbs./sq. in. at a temperature from between about 100 to 200° C.

3. A process for producing a pressed wood article from wood particles, said wood particles being selected from the class consisting of cellulosic and ligno-cellulosic materials, which comprises the following steps: soaking the wood particles in liquid ammonia until said wood particles are substantially completely impregnated with the liquid ammonia, removing ammonia from said impregnated wood particles; and molding said impregnated wood particles into a desired form at a pressure of about 300 to 500 lbs./sq. in. and a temperature of about 200° C.

4. A process for producing a pressed wood article from ligno-cellulosic particles which comprises the following steps: soaking the ligno-cellulosic particles in liquid ammonia until said particles are substantially completely impregnated with the liquid ammonia, separating the impregnated particles from the liquid ammonia, and molding said impregnated particles into a desired form at a pressure of about 300 to 500 lbs./sq. in. and a temperature of from about 100 to 200° C.

5. A process for producing a pressed wood article from ligno-cellulosic particles which comprises the following steps: treating said particles with a resin, soaking the resin-treated ligno-cellulosic particles in liquid ammonia until said particles are substantially completely impregnated with the liquid ammonia, removing ammonia from said impregnated particles; and molding said resin-treated, impregnated particles into a desired form at a pressure of up to about 2500 lbs./sq. in. and a temperature of from about 100 to 200° C.

6. A process for producing a pressed wood article from woodflour which comprises the following steps: soaking the woodflour in liquid ammonia until said woodflour is substantially completely impregnated with the liquid ammonia, removing ammonia from said impregnated woodflour; and molding said impregnated woodflour into a desired form at a pressure of up to about 2500 lbs./sq. in. and a temperature from about 100 to 200° C.

7. A process for producing a pressed wood article from sawdust which comprises the following steps: soaking the sawdust in liquid ammonia until said sawdust is substantially completely impregnated with the liquid ammonia, removing ammonia from said impregnated sawdust; and molding said impregnated sawdust into a desired form at a pressure of up to about 2000 lbs./sq. in. and a temperature from about 100 to 200° C.

8. A process for producing a pressed wood article from ligno-cellulosic particles which comprises the following steps: adding to said particles a material which imparts water resistance, soaking the water-resistant ligno-cellulosic particles in liquid ammonia until said particles are substantially completely impregnated with the liquid ammonia, removing ammonia from said impregnated particles, and then molding the particles into a desired form at a pressure up to about 2000 lbs./sq. in. and a temperature from about 100 to 200° C.

9. A process for producing a toilet seat of pressed wood which comprises the following steps: mixing into woodflour a minor amount of zinc stearate, soaking the mixture of woodflour and zinc stearate in liquid ammonia until the woodflour is substantially completely impregnated with the liquid ammonia, separating the mixture of impregnated woodflour and zinc stearate from the liquid ammonia, and molding the mixture of impregnated woodflour and zinc stearate into a toilet seat at a pressure of 300 to 500 lbs./sq. in. and a temperature of about 150° C.

10. A process for producing a desk top of pressed wood which comprises the following steps: mixing sawdust with a minor amount of zinc stearate, soaking the mixture of sawdust and zinc stearate in liquid ammonia until the sawdust is substantially completely impregnated with the liquid ammonia, separating the mixture of impregnated sawdust and zinc stearate from the liquid ammonia, and molding the mixture of impregnated sawdust and zinc stearate into a desk top at a pressure of about 300 to 2500 lbs./sq. in.

11. A process for producing a top of a work bench of pressed wood which comprises the following steps: treating sawdust with a urea-formaldehyde resin, soaking the resin-treated sawdust in liquid ammonia until said sawdust is substantially completely impregnated with the liquid ammonia, separating the resin-treated, impregnated sawdust from the liquid ammonia, and molding the resin-treated impregnated sawdust into a top of a work bench at a pressure of about 300 to 500 lbs./sq. in. and a temperature of about 200° C.

12. An article of pressed wood produced by a process which comprises the following steps: soaking wood particles, said wood particles being selected from the class consisting of cellulosic and ligno-cellulosic material, in liquid ammonia until said wood particles are substantially completely impregnated with the liquid ammonia, removing ammonia from said impregnated wood particles; and molding said impregnated wood particles into a desired form at pressure ranging from 300 to 2500 lbs./sq. in.

13. An article of pressed wood produced by a process which comprises the following steps: soaking ligno-cellulosic particles in liquid ammonia until said particles are substantially completely impregnated with the liquid ammonia, separating said impregnated particles from the liquid ammonia, and molding said impregnated particles into a desired form at a pressure of about 300 to 2500 lbs./sq. in. and a temperature from about 100 to 200° C.

14. An article of pressed wood produced by a process which comprises the following steps: treating ligno-cellulosic particles with a resin, soaking the resin-treated ligno-cellulosic particles in liquid ammonia until said particles are substantially completely impregnated with the liquid ammonia, separating the resin-treated, impregnated particles from the liquid ammonia, and then molding the resin-treated, impregnated particles into a desired form at a pressure up to about 300 to 500 lbs./sq. in. and a temperature from about 100 to 200° C.

References Cited by the Examiner

UNITED STATES PATENTS

| 2,037,522 | 4/1936 | Lundback | 264—109 |
| 2,708,637 | 5/1955 | Glab | 264—124 |
| 2,779,683 | 1/1957 | Gill | 264—124 |

ROBERT F. WHITE, *Primary Examiner.*

J. R. HALL, *Assistant Examiner.*